(12) United States Patent
Tajima

(10) Patent No.: US 11,069,031 B2
(45) Date of Patent: Jul. 20, 2021

(54) IMAGE PROCESSING APPARATUS, CONTROL METHOD FOR IMAGE PROCESSING APPARATUS, IMAGE PICKUP APPARATUS, AND NON-TRANSITORY COMPUTER-READABLE STORAGE MEDIUM TO CONTROL REFLECTED COLOR COMPONENTS OF INPUT IMAGE

(71) Applicant: CANON KABUSHIKI KAISHA, Tokyo (JP)

(72) Inventor: Kaori Tajima, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 30 days.

(21) Appl. No.: 16/446,421

(22) Filed: Jun. 19, 2019

(65) Prior Publication Data

US 2020/0005435 A1    Jan. 2, 2020

(30) Foreign Application Priority Data

Jun. 27, 2018  (JP) .............................. JP2018-121915

(51) Int. Cl.
| | |
|---|---|
| *G06T 5/00* | (2006.01) |
| *G06T 7/90* | (2017.01) |
| *H04N 5/235* | (2006.01) |
| *G06T 7/44* | (2017.01) |
| *H04N 5/243* | (2006.01) |

(52) U.S. Cl.
CPC .............. *G06T 5/002* (2013.01); *G06T 7/44* (2017.01); *G06T 7/90* (2017.01); *H04N 5/2351* (2013.01); *H04N 5/243* (2013.01); *G06T 2207/10024* (2013.01); *G06T 2207/20024* (2013.01); *G06T 2207/30201* (2013.01)

(58) Field of Classification Search
CPC .. G06T 5/00; G06T 5/002; G06T 7/44; G06T 7/90; G06T 2207/10024; G06T 2207/20024; G06T 2207/30201; H04N 5/2256; H04N 5/2351; H04N 5/243; H04N 5/23229; H04N 5/37452
USPC ........................................................ 382/190
See application file for complete search history.

(56) References Cited

U.S. PATENT DOCUMENTS

| | | | | |
|---|---|---|---|---|
| 2009/0310828 A1* | 12/2009 | Kakadiaris | ........... | G06K 9/4661 382/118 |
| 2016/0269705 A1* | 9/2016 | Tajima | ............... | H04N 5/23229 |
| 2016/0335745 A1* | 11/2016 | Tajima | ................... | G06T 5/008 |
| 2017/0079599 A1* | 3/2017 | Yoshida | ............... | A61B 5/7278 |
| 2017/0244882 A1* | 8/2017 | Kitajima | .............. | H04N 5/2352 |
| 2019/0364201 A1* | 11/2019 | Hirai | .................. | H04N 5/2351 |

FOREIGN PATENT DOCUMENTS

JP        2010-135996 A      6/2010

* cited by examiner

*Primary Examiner* — Gabriel I Garcia

(74) *Attorney, Agent, or Firm* — Canon U.S.A., Inc. IP Division

(57) ABSTRACT

A control method for an image processing apparatus includes setting a virtual light source, analyzing characteristics of a partial region of a subject in an input image acquired through image capturing, smoothing at least a portion of the input image on the basis of information about a result of the analysis, generating, on the basis of the smoothed input image, reflected color components in a case where the subject is irradiated with light from the virtual light source, and performing correction based on the reflected color components on the input image.

13 Claims, 6 Drawing Sheets

IMAGE PROCESSING APPARATUS, CONTROL METHOD FOR IMAGE PROCESSING APPARATUS, IMAGE PICKUP APPARATUS, AND NON-TRANSITORY COMPUTER-READABLE STORAGE MEDIUM TO CONTROL REFLECTED COLOR COMPONENTS OF INPUT IMAGE

BACKGROUND

Field

One disclosed aspect of the embodiments relates to a technology for correcting images.

Description of the Related Art

Hitherto, a lighting processing technology for irradiating a subject in an image with light from a virtual light source after image capturing has been known. This lighting processing makes it possible to acquire a preferable image even when, for example, lighting conditions and the like at the time of image capturing are not good. In addition, for example, Japanese Patent Laid-Open No. 2010-135996 discloses a technology for extracting, as a shadow region, an area whose luminance is lower than the average luminance of an entire face region and performing processing for increasing the brightness of the extracted shadow region to perform pseudo lighting processing on a captured image. In this case, an example of a subject to be subjected to lighting processing is a face. A face has various facial parts examples of which are the cheeks, the nose, the eyes, and the mouth, and processing for correcting the brightness of the face having these facial parts is performed in lighting processing. In lighting processing, correction is performed on the basis of luminance (brightness). In a case where lighting processing is performed on a face, the lighting processing may affect not only the brightness of the face but also, for example, reproduction of the texture of the skin and the position of shadows on the face.

For example, the texture of the skin differs from facial part to facial part on the face. Facial parts such as the cheeks and the wings of the nose have a texture with a plurality of dots such as pores, and facial parts such as the eyes and the mouth have a texture with a plurality of lines such as fine wrinkles. The texture of each of the facial parts has a different frequency component.

SUMMARY

A control method for an image processing apparatus includes setting a virtual light source, analyzing characteristics of a partial region of a subject in an input image acquired through image capturing, smoothing at least a portion of the input image on the basis of information about a result of the analysis, generating, on the basis of the smoothed input image, reflected color components in a case where the subject is irradiated with light from the virtual light source, and performing correction based on the reflected color components on the input image.

Further features of the disclosure will become apparent from the following description of exemplary embodiments with reference to the attached drawings.

DESCRIPTION OF THE EMBODIMENTS

In the following, embodiments of the disclosure will be described in detail with reference to the attached drawings. Note that configurations illustrated in the following exemplary embodiments are mere examples, and the disclosure is not limited to the illustrated configurations.

Figure 1:
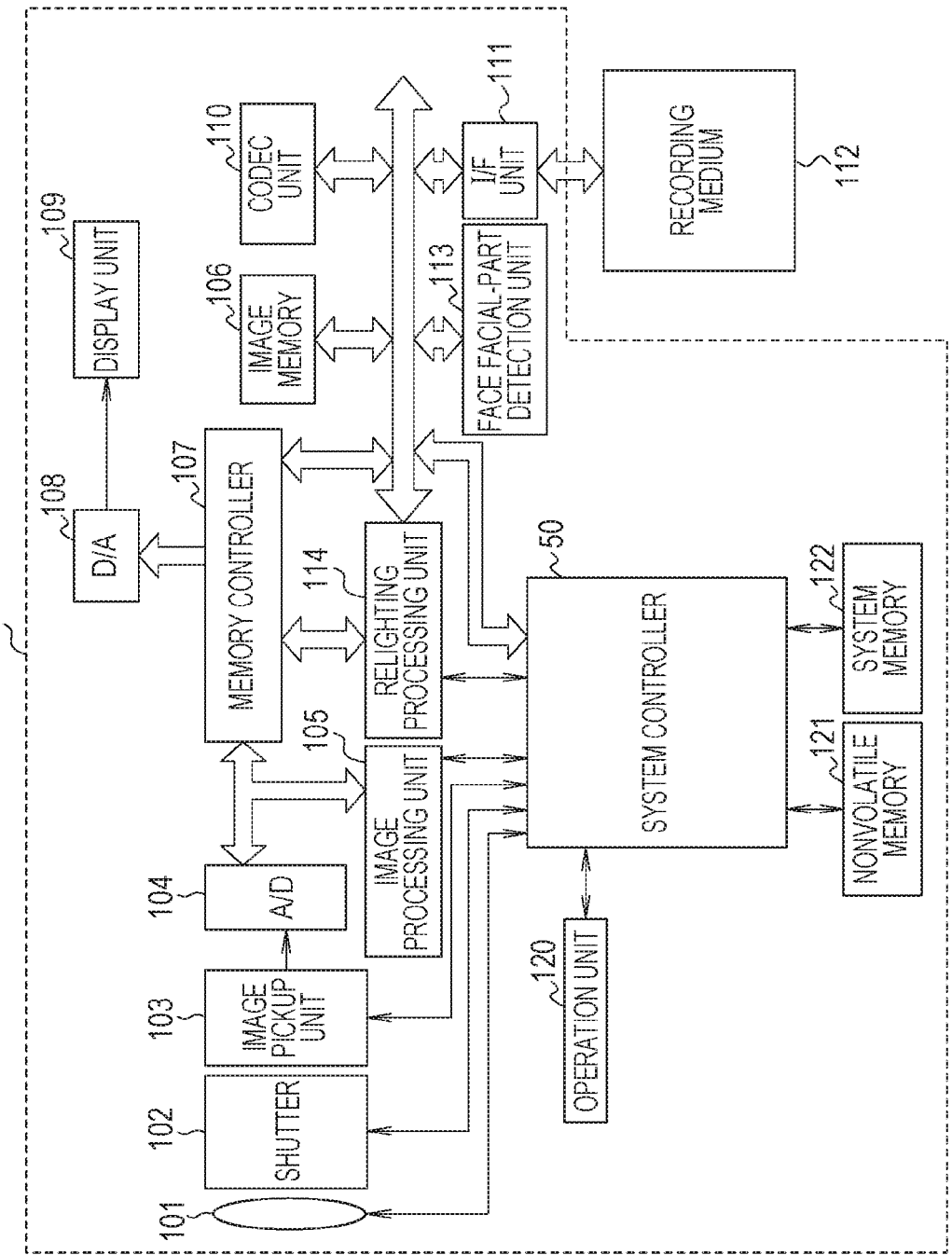
FIG. 1 is a diagram illustrating an example of the configuration of a digital camera.

In the following, a description will be made taking for example a digital camera as an example of an application of an image processing apparatus according to the disclosure. FIG. 1 is a block diagram illustrating an example of a schematic configuration of a digital camera 100 according to a present exemplary embodiment.

A lens group 101 is an image pickup optical system having a focus lens, a zoom lens, and an aperture, and forms an optical image of, for example, a subject on an image pickup element included in an image pickup unit 103. A shutter 102 is, for example, a focal-plane shutter, and performs an opening and closing operation under control performed by a system controller 50.

The image pickup unit 103 photoelectrically converts the optical image formed on the image pickup element through the lens group 101 into an electrical signal to output an analog image signal. The image pickup element of the image pickup unit 103 is a charge-coupled device (CCD) image sensor or a complementary metal-oxide-semiconductor (CMOS) image sensor. On the image pickup plane of the image pickup element, color filters corresponding to respective color components of three primary colors R (red), G (green), and B (blue) are provided in an array that is the so-called Bayer array on a pixel-by-pixel basis. Thus, the image pickup unit 103 outputs an analog image signal including RGB color signals of pixels corresponding to the Bayer array.

An analog-to-digital (A/D) conversion unit 104 converts the analog image signal output from the image pickup unit 103 into digital image data, and outputs the image data to an image processing unit 105 and a memory controller 107.

Under control performed by the memory controller 107, an image memory 106 temporarily stores, for example, image data obtained as a result of image capturing performed by the image pickup unit 103 and digital conversion performed by the A/D conversion unit 104 and image data obtained as a result of image processing performed by the image processing unit 105 to be described later. In addition, the image memory 106 also stores, for example, image data read from a recording medium 112 via an interface (I/F) unit 111 and image data for performing display at a display unit 109.

The recording medium 112 is, for example, a semiconductor memory card or a card-type hard disk. The recording medium 112 is removable from the digital camera 100, and stores, for example, image data captured by the digital camera 100 and image data captured by other digital cameras.

The I/F unit 111 is an interface unit that electrically connects the recording medium 112 and the digital camera 100 to each other. The image data captured by the digital camera 100 is sent to, via the I/F unit 111, and recorded on the recording medium 112. The image data read out from the recording medium 112 is sent to, for example, the image memory 106 via the I/F unit 111.

A face facial-part detection unit 113 performs predetermined image analysis processing on an image captured by the image pickup unit 103 and output from the A/D conversion unit 104 and an image read out by the memory controller 107 from the image memory 106 to detect a region where the face of a person appears from within the images. Furthermore, in the detected face region, the face facial-part detection unit 113 detects facial parts included in the face such as the eyes, the nose, the mouth, the cheeks, the ears, and the like and the position of each part. Data on the face and facial parts detected by the face facial-part detection unit 113 is temporarily stored in the image memory 106 via the memory controller 107, and is read out from the image memory 106 and sent to the image processing unit 105 and a relighting processing unit 114 as the need arises. The image processing unit 105 and a relighting processing unit 114 will be described later.

A digital-to-analog (D/A) converter 108 converts image data into an analog image signal and outputs the analog image signal to the display unit 109. Examples of the image data include image data captured by the image pickup unit 103 and output from the A/D conversion unit 104, image data read out from the image memory 106, and image data read out from the recording medium 112.

The display unit 109 has a display device such as a liquid crystal display (LCD), and displays an image based on the analog image signal output from the D/A converter 108. The display unit 109 displays, for example, images obtained by, for example, performing image capturing, and live view images captured by the image pickup unit 103 when so-called live view display is performed. The display unit 109 also displays a user interface image used when, for example, the user operates the digital camera 100.

An operation unit 120 includes, for example, a shutter button and various switches of the digital camera 100 and a touch panel arranged on, for example, a screen of the display unit 109. The operation unit 120 detects an operation performed by the user, and notifies the system controller 50 of information about the detected operation.

A codec unit 110 compresses and decompresses image data. The codec unit 110 compresses image data stored in the image memory 106 in a format that conforms to standards such as Joint Photographic Experts Group (JPEG) and Moving Picture Experts Group (MPEG). Under control performed by the system controller 50, the image data compressed by the codec unit 110 is recorded on the recording medium 112 via the I/F unit 111. In addition, under control performed by the system controller 50, the codec unit 110 can decompress the compressed image data read out from the recording medium 112 via the I/F unit 111.

A nonvolatile memory 121 serves as a backing storage and includes a nonvolatile semiconductor memory an example of which is an electrically erasable programmable read-only memory (EEPROM) for storing, for example, programs and parameters.

A system memory 122 serves as a main storage, and programs read out from the nonvolatile memory 121 are loaded into the system memory 122. In addition, the system memory 122 stores constants and variables for operation of the system controller 50. That is, for example, the constants and variables for operation of the system controller 50 and the programs read out from the nonvolatile memory 121 are loaded into the system memory 122.

The system controller 50 includes a central processing unit (CPU) or a microprocessing unit (MPU), and loads, into a workspace of the system memory 122, and executes the programs stored in the nonvolatile memory 121 to control various functions of the entire digital camera 100 according to the present exemplary embodiment. For example, on the basis of an operation input from the user through the operation unit 120 and a setting status, the system controller 50 performs various types of control, which are for example control of capturing images, control of various types of image processing, control of relighting processing, and switching of a camera operation mode. Programs according to the present exemplary embodiment include a program for controlling the relighting processing to be described later and a program for, for example, executing processing illustrated by a flow chart to be described later in addition to a basic operation program used when the digital camera 100 captures an image of a subject. The programs executed by the system controller 50 do not have to be prestored in the nonvolatile memory 121, and may be acquired from, for example, the recording medium 112 or alternatively may also be acquired via, for example, an unillustrated network.

The image processing unit 105 performs various types of image processing, examples of which include white balance processing, gamma (γ) processing, edge enhancement, and color correction processing, on an image captured by the image pickup unit 103 or an image read out from the image memory 106. In addition, the image processing unit 105 calculates evaluation values by using, for example, information about a detection result such as the position of a face region and the position of a facial part detected by the face facial-part detection unit 113 and image data of a captured image, the evaluation values being to be used when, for example, exposure control and distance measurement control are performed. Information about the calculated evaluation values is sent to the system controller 50. On the basis of the evaluation values calculated by the image processing unit 105, the system controller 50 in this case performs, for example, exposure control such that exposure is adjusted for the face of a subject and distance measurement control such that the face or eyes of a subject are brought into focus. Specifically, the system controller 50 performs, for example, so-called through the lens (TTL) autofocus (AF) processing, TTL automatic exposure (AE) processing, and TTL auto white balance (AWB) processing. Known various techniques can be used for calculation processing for the evaluation values used when, for example, exposure control and distance measurement control are performed, and the description thereof and illustrations therefor will be omitted herein.

The relighting processing unit 114 performs relighting processing (lighting processing) on an image captured by the image pickup unit 103 and an image read out from the image memory 106. The relighting processing according to the present exemplary embodiment is processing in which the brightness of a region of a specific subject in an image is corrected by applying light from a virtual light source and the appearance of the region of the subject including at least either the texture or tone characteristics of the region of the subject is also corrected. The system controller 50 in this case controls the relighting processing performed by the relighting processing unit 114 with reference to a detection result such as the position of a face region and the position of a facial part detected by the face facial-part detection unit 113. Details of the relighting processing according to the present exemplary embodiment will be described later.

Schematic Configuration of Image Processing Unit

Figure 2:
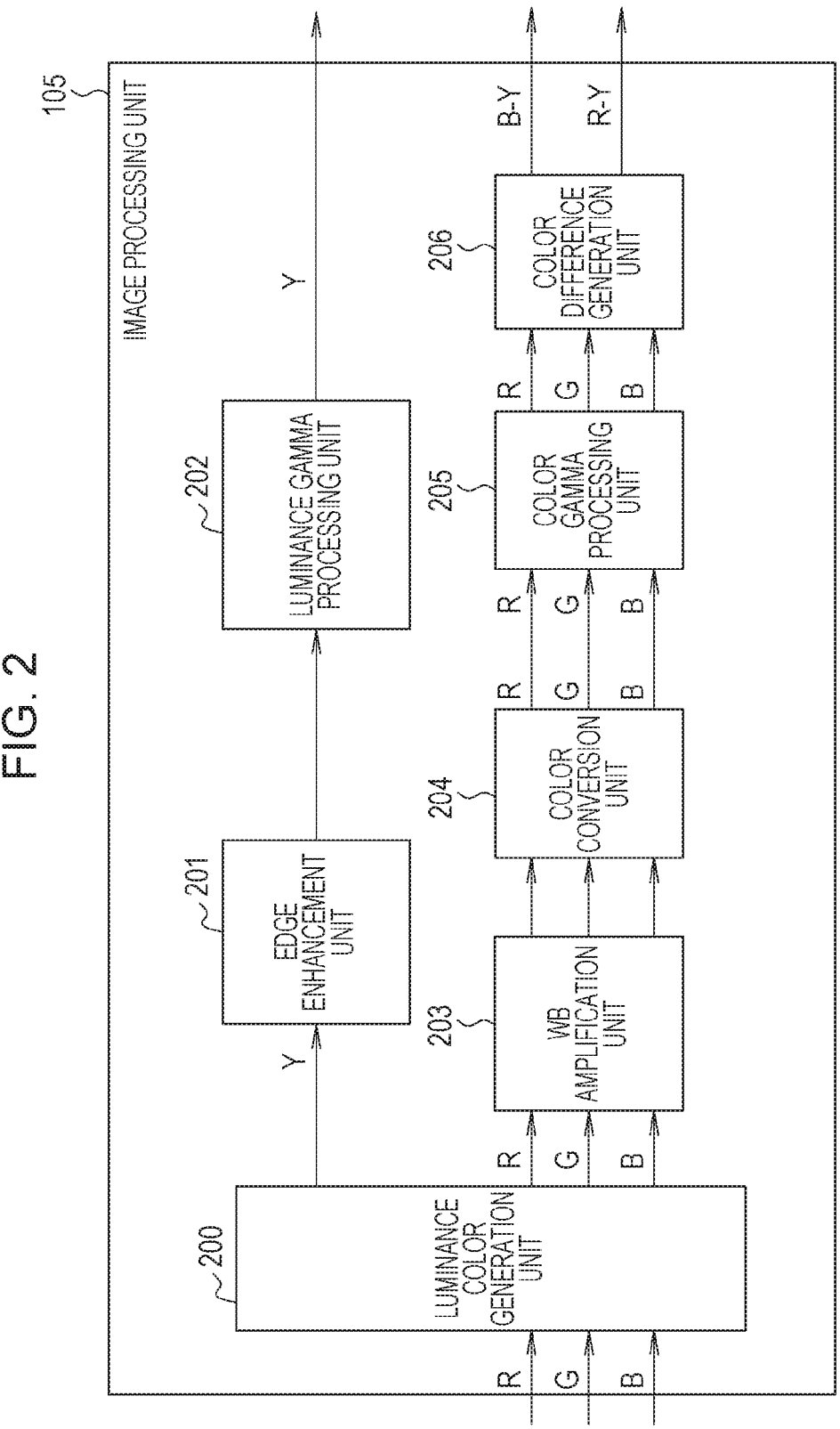
FIG. 2 is a diagram illustrating an example of the configuration of an image processing unit.

FIG. 2 is a block diagram illustrating an example of the configuration of the image processing unit 105.

In FIG. 2, the image processing unit 105 includes a luminance color generation unit 200, an edge enhancement unit 201, a luminance gamma processing unit 202, a white balance (WB) amplification unit 203, a color conversion unit 204, a color gamma processing unit 205, and a color difference generation unit 206.

In the image processing unit 105, for example, image data from the A/D conversion unit 104 is input to the luminance color generation unit 200, the image data being obtained by performing digital conversion on an image captured by the image pickup unit 103. The image data input to the luminance color generation unit 200 is RGB data corresponding to the so-called Bayer array. The luminance color generation unit 200 performs synchronization processing on the input image data corresponding to the Bayer array, and generates color signals for R, G, and B (hereinafter referred to as RGB signals). In addition, the luminance color generation unit 200 generates a luminance signal Y from the RGB signals. The luminance color generation unit 200 outputs the RGB signals to the WB amplification unit 203 and outputs the luminance signal Y to the edge enhancement unit 201.

The edge enhancement unit 201 performs edge enhancement processing on the image based on the luminance signal Y supplied from the luminance color generation unit 200, and outputs the resulting luminance signal Y after the edge enhancement processing to the luminance gamma processing unit 202.

The luminance gamma processing unit 202 performs gamma correction on the luminance signal Y supplied from the edge enhancement unit 201. The resulting luminance signal Y after the gamma correction is sent to and temporarily stored in the image memory 106.

The WB amplification unit 203 performs, as described later, processing in which white balance is adjusted by multiplying the RGB signals, which are color signals, by a gain based on a white balance gain value calculated by the system controller 50. The RGB signals whose white balance has been adjusted by the WB amplification unit 203 are sent to the color conversion unit 204.

The color conversion unit 204 performs a matrix operation on the RGB signals whose white balance has been adjusted, and the RGB signals are converted into RGB signals having desired color balance. The RGB signals having the desired color balance are sent to the color gamma processing unit 205.

The color gamma processing unit 205 performs gamma correction on the RGB signals supplied from the color conversion unit 204, and thereafter outputs the resulting RGB signals to the color difference generation unit 206.

The color difference generation unit 206 generates color difference signals R-Y and B-Y from the RGB signals on which the color gamma processing unit 205 has performed color gamma processing. The color difference signals R-Y and B-Y are sent to and temporarily stored in the image memory 106.

The image data, which is the luminance signal Y and color difference signals R-Y and B-Y, temporarily stored in the image memory 106 is thereafter sent to the codec unit 110 illustrated in FIG. 1 under control performed by the system controller 50. As a result, the codec unit 110 performs compression encoding on the image data, which is the luminance signal Y and color difference signals R-Y and B-Y, in accordance with predetermined standards. The data obtained as a result of the compression encoding performed by the codec unit 110 is recorded on the recording medium 112 via the I/F unit 111 under control performed by the system controller 50 as described above. In addition, in a case where the relighting processing to be described later is executed in the present exemplary embodiment, the luminance signal Y and color difference signals R-Y and B-Y temporarily stored in the image memory 106 are sent to the relighting processing unit 114.

Relighting Processing

Next, the relighting processing according to the present exemplary embodiment will be described.

In the present exemplary embodiment, as an example of the relighting processing, image correction processing is assumed in which an image of the face of a person is irradiated with light from a virtual light source on the basis of an instruction from the user such that, for example, the brightness of the face, the texture of the skin of the face, and shadows on the face can be corrected.

In the digital camera 100 according to the present exemplary embodiment, the system controller 50 calculates a control parameter for the relighting processing before the relighting processing unit 114 executes the relighting processing. For the relighting processing unit 114, the system controller 50 sets the control parameter.

Figure 3:
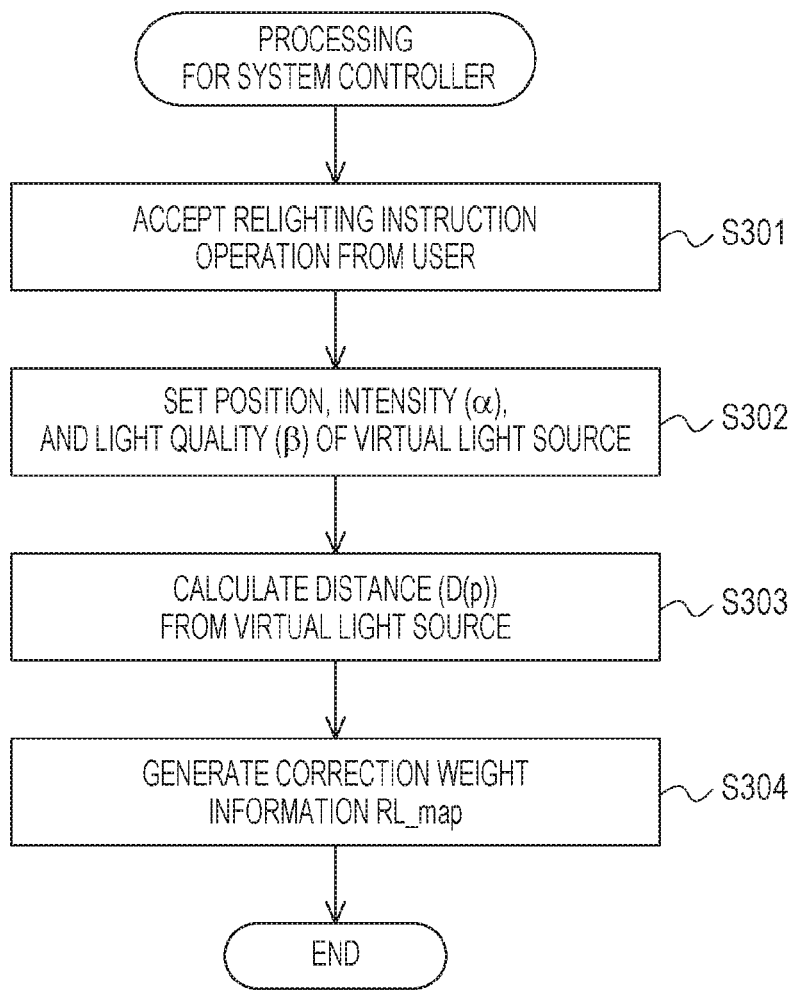
FIG. 3 is a flow chart of parameter setting processing for relighting.

FIG. 3 illustrates a flow chart for processing in which the system controller 50 sets the control parameter for the relighting processing. Note that the processing illustrated by the flow chart illustrated in FIG. 3 is realized by the system controller 50 executing a program according to the present exemplary embodiment. Note that, in the description below, processing steps S301 to S304 will be simply written as S301 to S304. The same applies to the flow chart illustrated in FIG. 6 and to be described later.

First, in S301, the system controller 50 acquires information about an operation performed by the user from the operation unit 120. In this case, in the digital camera 100 according to the present exemplary embodiment, the relighting processing is performed, for example, in a case where a camera operation mode for executing the relighting processing is selected through an operation performed by the user. In addition, in the digital camera 100 according to the present exemplary embodiment, a menu for selecting the camera operation mode for executing the relighting processing is available in various setting menus displayed on a user interface screen. The menu for the relighting processing includes a menu for inputting parameters representing, for example, the position of the virtual light source, the intensity $\alpha$ (brightness) of the virtual light source, the light quality $\beta$ of the virtual light source, the direction (direction vector) of the virtual light source, and the distance between the virtual light source and a subject. Thus, via the operation unit 120 and the user interface screen, the user can select the camera operation mode for executing the relighting processing and set various parameters representing, for example, the position, intensity $\alpha$, light quality $\beta$, direction, and distance of the virtual light source. The system controller 50 acquires, on the basis of operation information from the operation unit 120, various parameters representing, for example, selection of the camera operation mode for executing the relighting processing and the position, intensity $\alpha$, and light quality $\beta$ of the virtual light source. Note that the various parameters representing, for example, the position, intensity $\alpha$, and light quality $\beta$ of the virtual light source may be set through inputting of for example numerical values or may also be set by making a selection from preset items.

In this case, the light quality β of the virtual light source is for example a parameter representing a light characteristic (property), that is, the degree of light diffusion such as soft light that diffuses in various directions and hard light that hardly diffuses. For example, in the case of hard light, light from a light source hardly diffuses and is directly applied to a subject, and thus a darker shadow is cast on the face and, for example, the texture such as pores and wrinkles is enhanced. In contrast, in the case of soft light, light from a virtual light source diffuses and is applied to a subject, and thus a shadow is hardly cast on the face and the texture such as pores and wrinkles is smoothly reproduced. Thus, it is possible to control the texture of and shadows on the surface of the subject by setting the light quality β of the virtual light source. The parameter representing the light quality β of the virtual light source may be set on the basis of an instruction from the user, or may also be selected in accordance with the properties of the subject determined by the system controller 50 from among a plurality of light quality options prepared in advance for respective subject properties. In a case where the system controller 50 sets the light quality β, for example, the system controller 50 determines the gender and age of the subject on the basis of a detection result on the face and facial parts and acquires the gender and age of the subject as properties of the subject. The system controller 50 sets the parameter representing the light quality β of the virtual light source on the basis of the properties of the subject, which are the gender and age. As a specific example, for example, it is conceivable that the system controller 50 may select a parameter with which the light quality is set to soft light in a case where the subject is female, and may select a parameter with which the light quality is set to hard light such that contrast is enhanced in a case where the subject is male.

Figure 4:
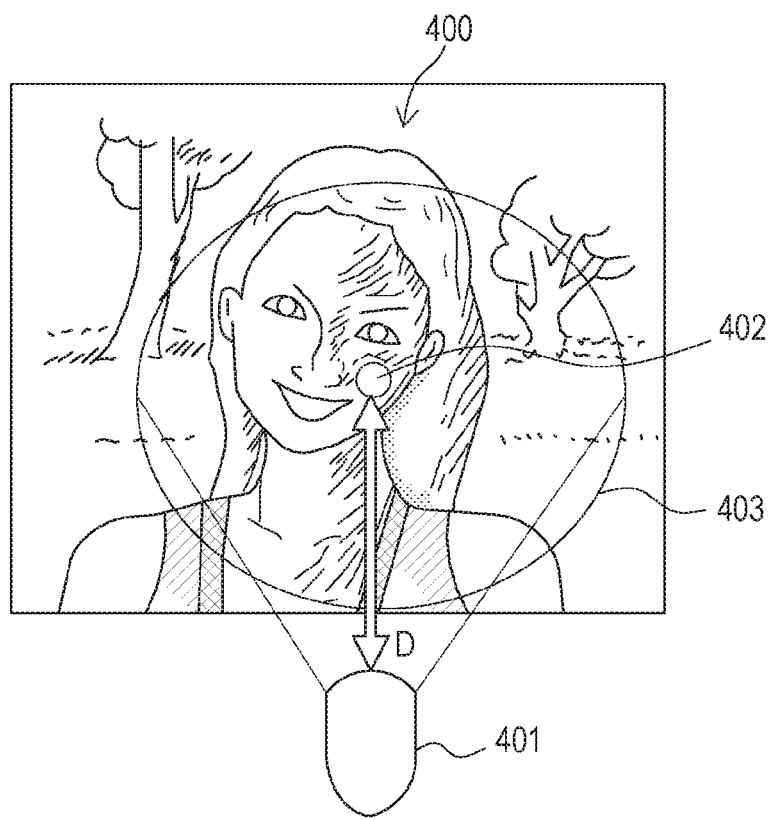
FIG. 4 is a diagram illustrating a relationship between a subject and a virtual light source.

Next, in S302, the system controller 50 sets, as control parameters of the relighting processing unit 114, the various parameters representing, for example, the position, intensity α, light quality β, direction, and distance of the virtual light source set in S301. FIG. 4 illustrates an example of the position of a virtual light source 401, an example of a range where a subject 400 is irradiated with light from the virtual light source 401 (an irradiation range 403), an example of a center irradiation position 402 in the irradiation range 403, and an example of a distance D from the virtual light source 401 to the center irradiation position 402. Note that the irradiation range 403 of the virtual light source 401 is a range that is affected by the virtual light source 401, and thus the outside the irradiation range 403 is a region that is not affected by the virtual light source 401.

Next, in S303, for pixels of an input image, the system controller 50 calculates a distance D(p) from the virtual light source for each pixel, and stores the distance D(p) in association with the position of the pixel in the system memory 122.

In S304, the system controller 50 calculates correction weight information RL_map, which indicates to what extent virtual-light-source reflected color components are to be added at each pixel position of the input image, by using Equation (1) below and stores the correction weight information RL_map in the system memory 122.

$$RL\_map = \alpha \cdot (L \cdot N(p))/(D(p)^2) \quad (1)$$

In Equation (1), α denotes the intensity of the virtual light source, L denotes a direction vector (a vector indicated by an arrow in FIG. 4) of the virtual light source with respect to the subject, and D(p) denotes the distance between the virtual light source and the subject at a pixel position p. The intensity α of the virtual light source, the direction vector L of the virtual light source, and the distance D from the virtual light source to the center irradiation position on the subject are parameters set on the basis of the input performed by the user in S301. In addition, N(p) in Equation (1) denotes a normal vector serving as normal information about the subject at the pixel position p, and normal vectors N at the subject are generated by the system controller 50 in advance before performance of the relighting processing and retained in the system memory 122. For example, the system controller 50 refers to a plurality of images captured in advance from different viewpoints, generates a three-dimensional shape model of the subject on the basis of the parallax between these images, and generates a normal vector of the three-dimensional shape model. The normal vector of the three-dimensional shape model is, in other words, information representing a three-dimensional shape of the subject. The system controller 50 generates information about the normal vector N in advance and causes the system memory 122 to retain the information. Note that the normal vector generation method is an example, and the normal vector may be generated in a different method.

Next, the configuration and operation of the relighting processing unit 114 will be described.

Figure 5:
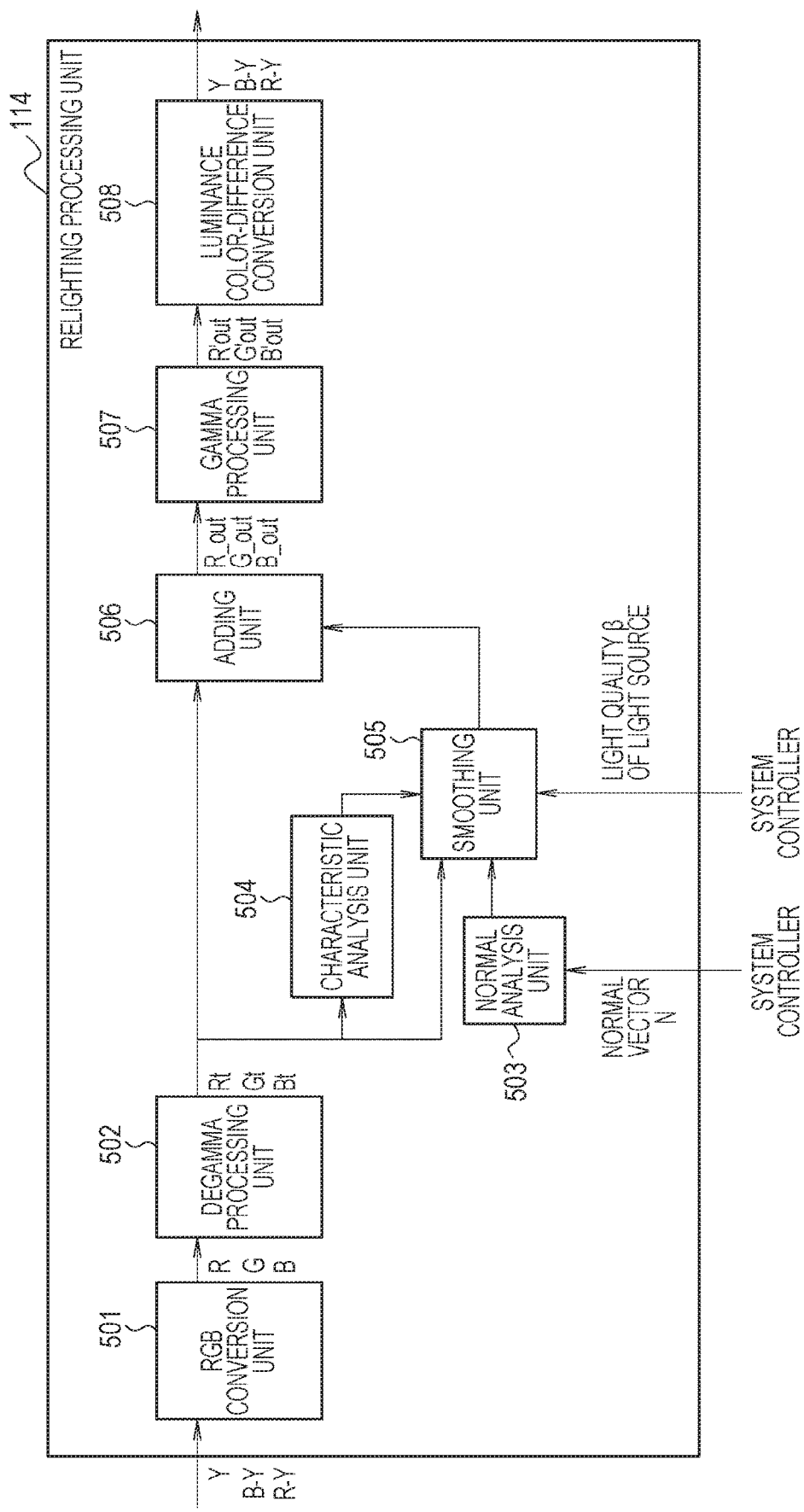
FIG. 5 is a diagram illustrating an example of the configuration of a relighting processing unit.

FIG. 5 is a block diagram illustrating an example of the configuration of the relighting processing unit 114. As illustrated in FIG. 5, the relighting processing unit 114 includes an RGB conversion unit 501, a degamma processing unit 502, a normal analysis unit 503, a characteristic analysis unit 504, a smoothing unit 505, an adding unit 506, a gamma processing unit 507, and a luminance color-difference conversion unit 508.

In FIG. 5, the RGB conversion unit 501 converts the input luminance and color difference signals (Y, B-Y, R-Y) into RGB signals, and outputs the RGB signals resulting from the conversion to the degamma processing unit 502. The degamma processing unit 502 converts the RGB signals received from the RGB conversion unit 501 into RGB linear data by performing, on the RGB signals, calculation processing using the inverse of the gamma characteristics used by the color gamma processing unit 205 of the image processing unit 105 (that is, degamma processing). The degamma processing unit 502 outputs RGB signals Rt, Gt, and Bt resulting from the degamma processing to the characteristic analysis unit 504, the smoothing unit 505, and the adding unit 506.

The normal analysis unit 503 refers to the normal vectors N received from the system controller 50, and analyzes characteristics of changes in normal vectors near a pixel of interest, that is, analyzes the amount of change in the three-dimensional shape of the subject. Information about the result of the normal characteristic analysis performed by the normal analysis unit 503 is sent to the smoothing unit 505. Details on, for example, the reason why the normal analysis unit 503 analyzes the characteristics of changes in the normal vectors near the pixel of interest will be described later.

The characteristic analysis unit 504 refers to the RGB signals Rt, Gt, and Bt resulting from the degamma processing, and analyzes feature values such as the frequency component and color components of a partial region of the subject in the image based on the resulting RGB signals. Information about the result of the image characteristic analysis performed by the characteristic analysis unit 504 is sent to the smoothing unit 505. Details on, for example, the reason why the characteristic analysis unit 504 analyzes feature values such as the frequency component and color components of the partial region of the subject in the image will be described later.

The smoothing unit 505 is capable of controlling properties of smoothing processing on the basis of the normal analysis result from the normal analysis unit 503, the image characteristic analysis result from the characteristic analysis unit 504, and the parameter representing the light quality β of the virtual light source output from the system controller 50. In addition, the smoothing unit 505 according to the present exemplary embodiment performs, for example, m×m pixel spatial filter processing and can adjust the strength of smoothing in an arbitrary direction by setting filter coefficients for smoothing in this case for the spatial filter processing. The smoothing unit 505 executes smoothing processing having the determined properties on the RGB signals resulting from the degamma processing, and outputs the RGB signals resulting from the smoothing processing to the adding unit 506. Details on control of the properties of the smoothing processing in the smoothing unit 505 will be described later.

The adding unit 506 performs processing for generating virtual-light-source reflected color components used to add an effect in relighting performed with the virtual light source to the input image and correction processing.

The adding unit 506 first generates RGB reflected color components Rv(p), Gv(p), and Bv(p) from the virtual light source through calculation of Equations (2), (3), and (4) using the RGB signals resulting from the smoothing processing and the correction weight information RL_map set by the system controller 50.

$$Rv(p)=RL\_map(pz) \cdot f(Rt(p),β) \quad (2)$$

$$Gv(p)=RL\_map(p) \cdot f(Gt(p),β) \quad (3)$$

$$Bv(p)=RL\_map(p) \cdot f(Bt(p),β) \quad (4)$$

In Equations (2) to (4), Rt(p), Gt(p), and Bt(p) indicate RGB reflected color components of the subject at the pixel position p. Smoothing processing at the smoothing unit 505 is defined as a function f(x, β), and x denotes RGB reflected color components Rt(p), Gt(p), and Bt(p) of the subject at each pixel position p to be smoothed. In the equations, β denotes a parameter indicating the strength of the smoothing processing (whether the degree of smoothing is high or low), and is a coefficient specified by the parameter representing the above-described light quality β of the virtual light source. As a result of the smoothing processing, f(x, β), that is, f(Rt(p), β), f(Gt(p), β), and f(Bt(p), β) are obtained by smoothing the reflected color components Rt(p), Gt(p), and Bt(p), respectively, at each pixel position p using a coefficient corresponding to the parameter representing the light quality β. The RGB reflected color components Rv(p), Gv(p), and Bv(p) calculated from Equations (2) to (4) represent tone characteristics for adjusting shadows on the face through addition of light from the virtual light source.

Next, as in Equations (5), (6), and (7), the adding unit 506 adds the reflected color components Rv(p), Gv(p), and Bv(p) generated at each pixel position p to linear RGB signals Rt(p), Gt(p), and Bt(p) resulting from the degamma processing at each pixel position p, respectively. As a result, reflected color component RGB signals RL(p), GL(p), and BL(p) to which light from the virtual light source is applied at each pixel position p are generated.

$$RL(p)=Rt(p)+Rv(p) \quad (5)$$

$$GL(p)=Gt(p)+Gv(p) \quad (6)$$

$$BL(p)=Bt(p)+Bv(p) \quad (7)$$

The adding unit 506 outputs, to the gamma processing unit 507, RGB signals R_out, G_out, and B_out of the image based on the reflected color component RGB signals RL(p), GL(p), and BL(p) generated at each pixel position p as described above.

The gamma processing unit 507 performs gamma correction on the RGB signals R_out, G_out, and B_out output from the adding unit 506. The gamma processing unit 507 performs gamma correction based on the gamma characteristics used by the color gamma processing unit 205 of the image processing unit 105, and the RGB signals R'out, G'out, and B'out resulting from the gamma correction are output to the luminance color-difference conversion unit 508.

The luminance color-difference conversion unit 508 generates a luminance signal Y and color difference signals R-Y and B-Y from the input RGB signals R'out, G'out, and B'out. The luminance signal Y and color difference signals R-Y and B-Y resulting from the relighting processing are accumulated in the image memory 106 via the memory controller 107, and thereafter, for example, undergoes compression encoding and other processing performed by the codec unit 110. In addition, the system controller 50 records, on the recording medium 112 via the I/F unit 111, the luminance signal Y and color difference signals R-Y and B-Y resulting from the relighting processing, and furthermore performs control such that the luminance signal Y and color difference signals R-Y and B-Y are displayed at the display unit 109 as an image resulting from the relighting processing.

Next, the effects of processing performed at the normal analysis unit 503 and the smoothing unit 505 will be described.

In the relighting processing according to the present exemplary embodiment, as expressed by the above-described Equations (2), (3), and (4), the reflected color components of the virtual light source are generated on the basis of the signals obtained by smoothing the reflected color components of the subject at the time of image capturing. Thus, the reproduction of the texture of and shadows on the subject at the time of the relighting processing is affected by what smoothing processing is performed at the smoothing unit 505. In addition, for example, in a case where uniform smoothing is performed, the texture and shadows may not be preferably reproduced.

In the present exemplary embodiment, the normal analysis unit 503 analyzes the characteristics of changes in the normal vectors near the pixel of interest, and the smoothing unit 505 locally controls the direction and strength of the smoothing processing for generating virtual-light-source reflected color components on the basis of the normal analysis result.

For example, changes in the normal vectors are large at the outline of the face, nose, and eyes of a subject, and it is desired that shadows in these regions be controlled. Thus, the direction and strength of smoothing is controlled at the smoothing unit 505 such that it becomes possible to reproduce shadows corresponding to the parameter representing the light quality set for the virtual light source.

In contrast, changes in the normal vectors are small at the cheeks and around the mouth on the face, and it is desired that the texture such as pores, wrinkles, and blotches in these regions be controlled. Thus, the direction and strength of smoothing is controlled at the smoothing unit 505 such that it becomes possible to reproduce texture corresponding to the parameter representing the light quality of the virtual light source.

In addition, in a case where the direction and strength of smoothing is determined to control texture reproduction, reference is also made to the characteristic analysis result from the characteristic analysis unit 504. For example, partial regions near facial parts such as the cheeks and the wings of the nose on a face are texture regions having a dot pattern like pores, and partial regions around, for example, the eyes and the mouth are texture regions having a line pattern like wrinkles. For these texture regions, the direction and strength of smoothing should vary from texture region to texture region. In addition, in a case where a partial skin region is a texture region having an uneven complexion like blotches, the direction and strength of smoothing should differ from those for texture regions having a dot pattern and texture regions having a line pattern. That is, depending on whether a region near a pixel of interest is a texture region having a dot pattern like pores, a texture region having a line pattern like wrinkles, or a texture region having an uneven complexion like blotches, the direction and strength of smoothing for reducing or enhancing the texture vary. Thus, the characteristic analysis unit 504 has analyzed in advance what characteristics such as a frequency component and color components a region around a pixel of interest includes. The smoothing unit 505 determines, on the basis of the analysis result, whether a partial region of a face is a texture region having a dot pattern like pores, a texture region having a line pattern like wrinkles, or a texture region having an uneven complexion like blotches. The smoothing unit 505 then sets the direction and strength of smoothing on the basis of the parameter representing the light quality β and the texture determination result. For example, in a case where it is desired that, for example, a dot pattern texture be reduced, smoothing processing such as averaging processing in which reference is made to surrounding pixels is performed. For example, in the case of a line pattern texture like wrinkles, smoothing processing is performed in a direction in which the edges of wrinkles are reduced. In addition, in the case of an uneven complexion texture like blotches, smoothing processing is performed in which reference is made to a wider region such that the uneven complexion is reduced.

Figure 6:
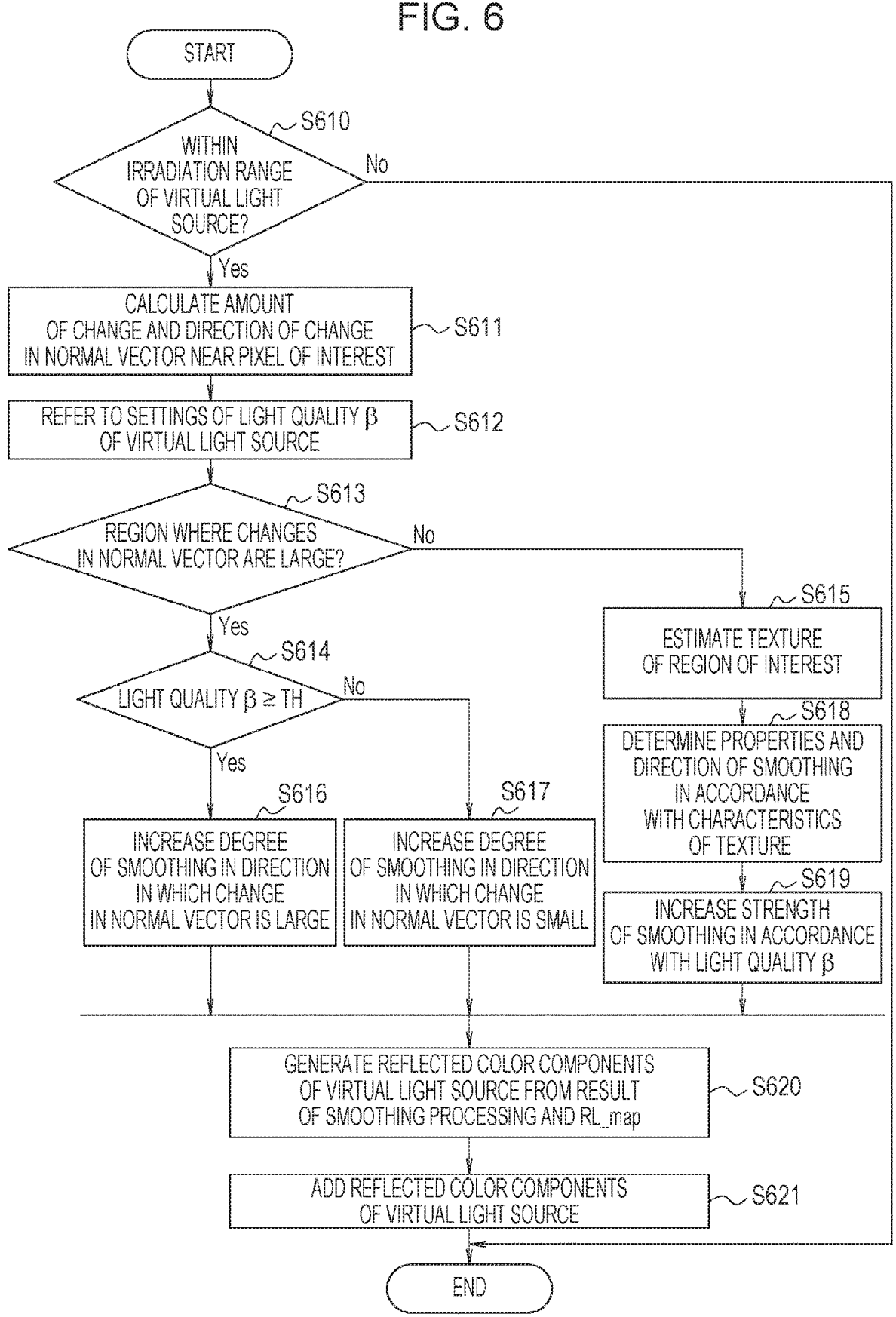
FIG. 6 is a flow chart illustrating operation of the relighting processing unit.

Next, with reference to the flow chart in FIG. 6, the procedure of the above-described relighting processing at the pixel of interest will be described. The processing illustrated by the flow chart in FIG. 6 is executed for each pixel of interest by the relighting processing unit 114 illustrated in FIG. 5 under control performed by the system controller 50.

In S610, the relighting processing unit 114 refers to the correction weight information RL_map calculated by the system controller 50, and determines whether a pixel of interest is within an irradiation range of the virtual light source. The relighting processing unit 114 determines that the pixel of interest is within the irradiation range of the virtual light source in a case where the value of the correction weight information RL_map at the pixel of interest is greater than or equal to a predetermined value, and the process proceeds to S611. In contrast, the relighting processing unit 114 determines that the pixel of interest is outside the irradiation range of the virtual light source in a case where the value of the correction weight information RL_map at the pixel of interest is less than the predetermined value, and the processing illustrated by the flow chart in FIG. 6 ends for the pixel of interest.

When the process proceeds to S611, the normal analysis unit 503 of the relighting processing unit 114 calculates, for the normal vectors of pixels around the pixel of interest, the difference between the normal vector at the pixel of interest and the normal vector of each of the pixels around the pixel of interest, and determines the peripheral pixel having the largest normal vector difference. The normal analysis unit 503 then associates the direction from the pixel of interest to the peripheral pixel having the largest normal vector difference, that is, the direction in which the change in normal vector becomes largest and the amount of the change with the positions of the pixels, and stores them as characteristics of the change in normal vector. After S611, the process proceeds to S612, which is performed by the smoothing unit 505, in processing performed by the relighting processing unit 114.

When the process proceeds to S612, the smoothing unit 505 acquires, for the pixel of interest, the parameter (a set value) representing the light quality β of the virtual light source from the system controller 50.

Next, in S613, the smoothing unit 505 acquires and refers to the characteristics of the change in normal vector, which are an analysis result from the normal analysis unit 503, to determine whether the pixel of interest is included in a region where changes in normal vector are large. As an example, in the case of a region of the face of a person, for example, changes in normal vector are large in a region near the nose and a region at the outline of the face, and, for example, changes in normal vector are small in a region under the eyes and a region of the cheeks. In a case where, for example, the amount of change in normal vector is greater than a predetermined amount-of-change threshold, the smoothing unit 505 determines that the pixel of interest is included in a region where changes in normal vector are large and the process proceeds to S614. In contrast, in a case where the amount of change in normal vector is less than or equal to the predetermined amount-of-change threshold, the smoothing unit 505 determines that the pixel of interest is included in a region where changes in normal vector are small and the process proceeds to S615.

When the process proceeds to S614, the smoothing unit 505 determines whether the parameter representing the light quality β of the virtual light source is greater than or equal to a predetermined setting threshold TH (β≥TH). In this case, for example, the value of the parameter representing the light quality β is defined as the value of an integer, which increases from 0 to n in units of 1. In addition, the greater the value of the light quality β of the virtual light source, the higher the degree of light diffusion, which indicates so-called soft light. In contrast, the smaller the value of the light quality β, the lower the degree of light diffusion, which indicates so-called hard light. In a case where the value of the light quality β is greater than or equal to the predetermined setting threshold TH, the smoothing unit 505 determines that the virtual light source is set to soft light and the process proceeds to S616. In contrast, in a case where the value of the light quality β is less than the predetermined setting threshold TH, the smoothing unit 505 determines that the virtual light source is set to hard light and the process proceeds to S617.

When the process proceeds to S616, the smoothing unit 505 refers to the direction of the change in normal vector, which is a normal analysis result at the pixel of interest, and sets smoothing processing such that the degree of smoothing is increased in the direction in which the change in normal vector is large.

In contrast, when the process proceeds to S617, the smoothing unit 505 refers to the direction of the change in normal vector, which is a normal analysis result at the pixel of interest, and sets smoothing processing such that the degree of smoothing is increased in the direction in which the change in normal vector is small.

As described above, the smoothing unit 505 is capable of performing m×m pixel spatial filter processing, and can adjust the strength of smoothing in an arbitrary direction by setting filter coefficients for smoothing. Thus, as in S616 or S617, smoothing processing according to the direction of the change in normal vector is possible. After S616 or S617, the process proceeds to S620, which is performed by the adding unit 506 and described later, in the processing performed by the relighting processing unit 114.

When the process proceeds to S615, the smoothing unit 505 acquires, from the characteristic analysis unit 504, and refers to feature values of a frequency component and color components of the characteristic analysis result at the pixel of interest to estimate what texture region includes the pixel of interest and its peripheral pixels. For example, in a case where a region including the pixel of interest and its peripheral pixels includes many high frequency components caused when the luminance signal changes on a dot-like short cycle, the smoothing unit 505 determines that the region is a pore texture region. In a case where a region including the pixel of interest and its peripheral pixels includes high frequency components caused when the luminance signal changes on a line-like cycle, the smoothing unit 505 determines that the region is a wrinkle texture region. After S615, the process proceeds to S618, which is performed by the smoothing unit 505.

When the process proceeds to S618, the smoothing unit 505 determines, on the basis of characteristics of the texture estimated in S615 for the region including the pixel of interest and its peripheral pixels, the direction of smoothing in smoothing processing. For example, in a case where it is estimated that the characteristics of the texture are those of a pore texture, the smoothing unit 505 refers to the peripheral pixels of the pixel of interest to spatially perform smoothing processing. For example, in a case where it is estimated that the characteristics of the texture are those of a wrinkle texture, the smoothing unit 505 sets properties of the smoothing processing such that the strength of smoothing is increased in the direction orthogonal to the direction of wrinkles. For example, in a case where it is estimated that the characteristics of the texture are those of a blotch texture, the smoothing unit 505 performs the smoothing processing such that low frequency changes in a color that looks like a blotch are reduced.

Next, when the process proceeds to S619, the smoothing unit 505 determines the strength of smoothing in accordance with the value of the parameter set for the light quality $\beta$ of the virtual light source.

In this case, the greater the value of the light quality $\beta$, the higher the degree of diffusion, thereby applying so-called soft light. Thus, the smoothing unit 505 increases the strength of smoothing to make textures such as pores, wrinkles, and blotches less noticeable. Specifically, in a case where the smoothing unit 505 performs the m×m pixel spatial filter processing, the smoothing unit 505 sets properties of a low pass filter that has a narrow band such that only low frequency components pass therethrough, so that the strength of smoothing is increased.

In addition, for example, the smaller the value of the light quality $\beta$, the lower the degree of diffusion, thereby applying so-called hard light. Thus, the smoothing unit 505 reduces the strength of smoothing to enhance textures such as pores, wrinkles, and blotches. Specifically, in a case where the smoothing unit 505 performs the m×m pixel spatial filter processing, the smoothing unit 505 sets properties of a low pass filter that has a wide band such that low to intermediate frequency components pass therethrough, so that the strength of smoothing is reduced. After S619, the process proceeds to S620, which is performed by the adding unit 506, in the processing performed by the relighting processing unit 114.

When the process proceeds to S620, the adding unit 506 generates, using the output from the smoothing unit 505 and the relighting correction weight information RL_map set by the system controller 50, reflected color components from the virtual light source by performing calculations expressed by the above-described Equations (2), (3), and (4).

Next, in S621, the adding unit 506 adds the virtual-light-source reflected color components generated in S620 to linear RGB signals output from the degamma processing unit 502.

This ends relighting processing at the pixel of interest.

As described above, in the digital camera 100 according to the present exemplary embodiment, smoothing processing for generating reflected color components of a virtual light source is controlled on the basis of normal vectors in a partial region of a subject to which light from the virtual light source is applied and characteristics of a texture of the subject. With the digital camera 100 according to the present exemplary embodiment, the appearance of a captured image including at least one of a texture and tone characteristics can be adjusted in a case where light from a virtual light source is applied. That is, with the digital camera 100 according to the present exemplary embodiment, an image can be acquired in which a texture of a subject and shadow reproduction characteristics can be controlled, the texture and shadow reproduction characteristics being affected in a case where relighting processing is performed on a captured image using a generated virtual subject reflected light component.

Note that the image processing unit 105 described above and illustrated in FIG. 2 and the relighting processing unit 114 described above and illustrated in FIG. 5 may be realized not only by a hardware configuration but also by a software configuration in which processes performed by the various units illustrated in FIGS. 2 and 5 are realized by, for example, a central processing unit (CPU) executing programs. In addition, a portion thereof may be realized by a hardware configuration and the rest may be realized by a software configuration. The programs for this software configuration do not have to be prepared in advance and may be acquired from a recording medium such as an unillustrated external memory or may also be acquired via an unillustrated network.

In addition, in the above-described exemplary embodiment, the case where an image captured by a digital camera undergoes relighting processing is taken for example; however, the relighting processing may also be applicable to, for example, images captured by smartphones, tablet terminals, industrial cameras, on-board cameras, and medical cameras. In addition, the relighting processing may also be performed by a personal computer.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-121915, filed Jun. 27, 2018, which is hereby incorporated by reference herein in its entirety.

What is claimed is:

1. An image processing apparatus comprising:
at least one processor and/or circuit configured to function as following units, which are
a setting unit configured to set a virtual light source,
an analysis unit configured to analyze characteristics of a partial region of a subject in an input image acquired through image capturing, and
a processing unit configured to smooth at least a portion of the input image on basis of information about an analysis result from the analysis unit, to generate, on the basis of the smoothed input image, reflected color components in a case where the subject is irradiated with light from the virtual light source, and to perform correction based on the reflected color components on the input image,
wherein the processing unit controls the reflected color components by controlling at least one of a direction and a strength of smoothing on the basis of the information about the analysis result from the analysis unit.

2. The image processing apparatus according to claim 1, wherein the analysis unit analyzes characteristics of at least one of a three-dimensional shape, a frequency component, and color components of the partial region.

3. The image processing apparatus according to claim 1, wherein the setting unit sets at least one of a position, an intensity, and a degree of light diffusion of the virtual light source.

4. The image processing apparatus according to claim 3, wherein in a case where the degree of light diffusion of the virtual light source is high, the processing unit controls the reflected color components on the basis of an amount of change in a three-dimensional shape of the partial region near a pixel of interest such that a shadow near the pixel of interest is reduced.

5. The image processing apparatus according to claim 3, wherein in a case where the degree of light diffusion of the virtual light source is high, the processing unit controls the reflected color components on the basis of characteristics of at least one of an amount of change in a three-dimensional shape, a frequency component, and color components of the partial region near a pixel of interest such that a change in a value of a pixel near the pixel of interest is reduced.

6. The image processing apparatus according to claim 3, wherein in a case where the degree of light diffusion of the virtual light source is low, the processing unit controls the reflected color components on the basis of an amount of change in a three-dimensional shape of the partial region near a pixel of interest such that a shadow near the pixel of interest is enhanced.

7. The image processing apparatus according to claim 3, wherein in a case where the degree of light diffusion of the virtual light source is low, the processing unit controls the reflected color components on the basis of characteristics of at least one of an amount of change in a three-dimensional shape, a frequency component, and color components of the partial region near a pixel of interest such that a change in a value of a pixel near the pixel of interest is enhanced.

8. The image processing apparatus according to claim 3, wherein the setting unit sets the degree of light diffusion of the virtual light source on the basis of an instruction from a user.

9. The image processing apparatus according to claim 3, wherein the setting unit detects characteristics of the subject in the input image, and sets the degree of light diffusion of the virtual light source on the basis of the characteristics of the subject.

10. The image processing apparatus according to claim 1, wherein the processing unit performs weighted addition on the input image on the basis of information set by the setting unit and the information about the analysis result from the analysis unit.

11. A control method for an image processing apparatus, comprising:
setting a virtual light source;
analyzing characteristics of a partial region of a subject in an input image acquired through image capturing;
smoothing at least a portion of the input image on the basis of information about an analysis result from the analyzing;
generating, on the basis of the smoothed input image, reflected color components in a case where the subject is irradiated with light from the virtual light source; and
performing correction based on the reflected color components on the input image,
wherein generating comprises controlling the reflected color components by controlling at least one of a direction and a strength of smoothing on the basis of the information about the analysis result from the analyzing.

12. An image pickup apparatus comprising:
an image pickup unit configured to acquire an input image by capturing an image; and
an image processing apparatus including
at least one processor and/or circuit configured to function as following units, which are
a setting unit configured to set a virtual light source,
an analysis unit configured to analyze characteristics of a partial region of a subject in an input image acquired through image capturing, and a processing unit configured to smooth at least a portion of the input image on the basis of information about an analysis result from the analysis unit, to generate, on the basis of the smoothed input image, reflected color components in a case where the subject is irradiated with light from the virtual light source, and to perform correction based on the reflected color components on the input image, wherein the processing unit controls the reflected color components by controlling at least one of a direction and a strength of smoothing on the basis of the information about the analysis result from the analysis unit.

13. A non-transitory computer-readable storage medium storing a program for causing a computer to execute following steps comprising:

setting a virtual light source;

analyzing characteristics of a partial region of a subject in an input image acquired through image capturing;

smoothing at least a portion of the input image on the basis of information about an analysis result of the analyzing;

generating, on the basis of the smoothed input image, reflected color components in a case where the subject is irradiated with light from the virtual light source; and performing correction based on the reflected color components on the input image, wherein generating comprises controlling the reflected color components by controlling at least one of a direction and a strength of smoothing on the basis of the information about the analysis result from the analyzing.

* * * * *